United States Patent
Rozman et al.

(10) Patent No.: US 10,778,127 B2
(45) Date of Patent: Sep. 15, 2020

(54) DIRECT CURRENT VOLTAGE REGULATION OF PERMANENT MAGNET GENERATOR

(71) Applicant: Hamilton Sundstrand Corporation, Charlotte, NC (US)

(72) Inventors: Gregory I. Rozman, Myrtle Beach, SC (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/126,037

(22) Filed: Sep. 10, 2018

(65) Prior Publication Data

US 2020/0083831 A1 Mar. 12, 2020

(51) Int. Cl.
| | |
|---|---|
| *H02P 9/30* | (2006.01) |
| *H02M 7/06* | (2006.01) |
| *H02M 7/5387* | (2007.01) |
| *H02M 1/44* | (2007.01) |
| *B64D 41/00* | (2006.01) |

(52) U.S. Cl.
CPC .............. *H02P 9/305* (2013.01); *B64D 41/00* (2013.01); *H02M 7/06* (2013.01); *H02M 1/44* (2013.01); *H02M 7/5387* (2013.01)

(58) Field of Classification Search
USPC .................................. 322/25, 28; 318/811
See application file for complete search history.

(56) References Cited

U.S. PATENT DOCUMENTS

| | | | | |
|---|---|---|---|---|
| 5,394,321 A | * | 2/1995 | McCleer | H02K 21/12 310/180 |
| 5,642,009 A | * | 6/1997 | McCleer | H02K 21/12 310/156.35 |
| 6,097,127 A | * | 8/2000 | Rivera | H02K 3/28 310/184 |

(Continued)

FOREIGN PATENT DOCUMENTS

| | | |
|---|---|---|
| EP | 2665152 A2 | 11/2013 |
| EP | 3343747 A1 | 7/2018 |

OTHER PUBLICATIONS

GB Search Report for Application No. 1912386.8, dated Feb. 21, 2020. 3 pages.

(Continued)

*Primary Examiner* — Pedro J Cuevas
(74) *Attorney, Agent, or Firm* — Cantor Colburn LLP

(57) ABSTRACT

An aircraft power generation unit to generate direct current (DC) power includes a flux regulated permanent magnet generator (PMG) that includes first through fourth sets of windings and a control coil and a rectifier section that include first through fourth six pulse rectifiers and a common local output bus. The unit also includes an output bus configured to be connected to the load and an H-bridge circuit connected across the output bus and outputs connected to the control coil. A controller receives an input signal from at least one of the windings and selectively couples either the common local output bus and fourth rectifier to the output bus negative rail and one or more of the first, second and third six-pulse rectifiers to the output bus to provide a constant voltage to the load.

20 Claims, 2 Drawing Sheets

(56) References Cited

U.S. PATENT DOCUMENTS

| | | | |
|---|---|---|---|
| 6,340,851 B1* | 1/2002 | Rinaldi | H01F 38/16 307/82 |
| 7,227,273 B2* | 6/2007 | Ahmad | B60L 50/51 290/400 |
| 7,274,547 B2 | 9/2007 | Al-Khayat et al. | |
| 7,301,310 B2 | 11/2007 | Ganev et al. | |
| 7,330,012 B2* | 2/2008 | Ahmad | B60L 50/51 318/811 |
| 7,385,372 B2* | 6/2008 | Ahmad | B60L 50/16 318/811 |
| 7,408,327 B2 | 8/2008 | Shah et al. | |
| 7,439,713 B2 | 10/2008 | Dooley | |
| 7,479,757 B2* | 1/2009 | Ahmad | B60L 50/51 318/811 |
| 7,710,081 B2* | 5/2010 | Saban | H02K 3/28 290/4 R |
| 7,960,948 B2* | 6/2011 | Saban | H02K 3/28 310/162 |
| 8,148,867 B2 | 4/2012 | Gieras et al. | |
| 8,432,137 B2 | 4/2013 | Rozman et al. | |
| 8,816,650 B2 | 8/2014 | Rozman et al. | |
| 8,836,293 B1* | 9/2014 | Rozman | H02P 9/48 322/25 |
| 8,885,372 B1 | 11/2014 | Nanut | |
| 8,975,876 B2* | 3/2015 | Rozman | H02P 9/305 322/28 |
| 9,059,647 B2 | 6/2015 | Rozman et al. | |
| 9,667,232 B2* | 5/2017 | Kuznetsov | H02J 3/30 |
| 9,853,512 B2* | 12/2017 | Trainer | H02K 1/16 |
| 9,941,827 B2 | 4/2018 | Rozman et al. | |
| 9,985,562 B1* | 5/2018 | Rozman | H02P 9/34 |
| 10,075,106 B2* | 9/2018 | Rozman | H02K 19/365 |
| 10,396,680 B1* | 8/2019 | Rozman | H02K 21/046 |
| 2005/0276020 A1* | 12/2005 | Ahmad | B60L 50/51 361/698 |
| 2006/0001318 A1* | 1/2006 | Ahmad | H02P 29/40 307/10.1 |
| 2006/0001319 A1* | 1/2006 | Ahmad | B60L 50/51 307/10.1 |
| 2006/0001397 A1* | 1/2006 | Ahmad | B60L 50/51 318/801 |
| 2007/0008741 A1 | 1/2007 | Al-Khayat et al. | |
| 2007/0182382 A1 | 8/2007 | Aoyama | |
| 2008/0103632 A1* | 5/2008 | Saban | H02K 3/28 700/286 |
| 2009/0009146 A1 | 1/2009 | Rozman et al. | |
| 2010/0244599 A1* | 9/2010 | Saban | H02K 3/28 310/71 |
| 2012/0120689 A1 | 5/2012 | Rozman et al. | |
| 2012/0126758 A1 | 5/2012 | Fang et al. | |
| 2013/0325366 A1* | 12/2013 | Rozman | H02J 1/00 702/35 |
| 2014/0266077 A1* | 9/2014 | Rozman | H02P 9/305 322/25 |
| 2014/0266079 A1* | 9/2014 | Rozman | H02P 9/02 322/28 |
| 2015/0061606 A1 | 3/2015 | Pan et al. | |
| 2015/0263526 A1* | 9/2015 | Kjær | H02J 3/386 290/44 |
| 2016/0233406 A1 | 8/2016 | Kurikuma et al. | |
| 2016/0301333 A1* | 10/2016 | Rozman | H02K 19/365 |
| 2017/0359009 A1* | 12/2017 | Rozman | H02K 11/049 |
| 2018/0131254 A1* | 5/2018 | Rozman | H02K 11/049 |
| 2018/0191229 A1 | 7/2018 | Rozman et al. | |
| 2018/0198395 A1 | 7/2018 | Gieras | |
| 2018/0287483 A1 | 10/2018 | Henrard | |
| 2019/0081582 A1 | 3/2019 | Rozman et al. | |
| 2019/0097546 A1* | 3/2019 | Rozman | H02M 7/483 |
| 2019/0097558 A1* | 3/2019 | Rozman | H02P 9/14 |
| 2020/0076340 A1 | 3/2020 | Rozman et al. | |

OTHER PUBLICATIONS

GB Search Report for Application No. 1912408.0, dated Feb. 21, 2020. 3 pages.

* cited by examiner

| Speed, rpm | Vdc1 | Vdc2 | Vdc3 | Vdc4 | Sw1 | Sw2 | Sw3 | Sw4 | Sw5 | Sw6 | Sw7 | Vdc |
|---|---|---|---|---|---|---|---|---|---|---|---|---|
| 20000 | 320 | 160 | 80 | 40 | Closed | Open | Open | Open | Open | Closed | Open | 320 |
| 18000 | 288 | 144 | 72 | 36 | Closed | Open | Closed | Closed | Open | Open | Open | 324 |
| 16000 | 256 | 128 | 64 | 32 | Closed | Closed | Closed | Open | Closed | Closed | Open | 320 |
| 14000 | 224 | 112 | 56 | 28 | Closed | Closed | Open | Closed | Closed | Open | Open | 308 |
| 12000 | 192 | 96 | 48 | 24 | Open | Closed | Closed | Closed | Open | Open | Closed | 312 |
| 10000 | 160 | 80 | 40 | 20 | Open | Open | Open | Closed | Closed | Open | Closed | 300 |

FIG. 2

DIRECT CURRENT VOLTAGE REGULATION OF PERMANENT MAGNET GENERATOR

BACKGROUND

Exemplary embodiments pertain to the art of power generation and, in particular, regulating a direct current (DC) voltage generated by a permanent magnet generator.

A conventional DC power generating system utilizes a 3-phase variable-speed permanent magnet generator (PMG) and an active rectifier. PMG's offers high efficiency and high power density in comparison with a wound-field synchronous generator. However, the size of the conventional two-level six switch active rectifier requires large size passive components, such as dc link capacitor and output power quality filter.

To achieve a high power density, multilevel topologies, such as an unidirectional Vienna Rectifier or a bi-directional neutral diode clamped multilevel converter, have been considered to achieve low harmonic distortion with moderate switching frequency and reduced EMI emissions compared to a standard 2-level active rectifier/inverter. However, these topologies are complex and expensive.

An alternative is to utilize a flux regulated (FR) PMG. In a flux regulated PMG, a controller can be utilized to control a current provided to a coil in the FR PMG that can fine tune the voltage output. However, in such cases, FR PMG output voltage buck regulation is limited to only 10-30% of nominal voltage at the rated load.

BRIEF DESCRIPTION

Disclosed is an aircraft power generation unit to generate direct current (DC) power provided to a load. The unit includes a flux regulated permanent magnet generator (PMG) that includes first, second, third and fourth sets of windings, each of the winding sets including three windings, and a control coil. The unit also includes a rectifier section that includes: a first six-pulse rectifier connected to the first set of windings and having a first rectifier positive rail and first rectifier negative rail; a second six-pulse rectifier connected to the second set of windings and having a second rectifier positive rail and a second rectifier negative rail; a third six-pulse rectifier connected to the third set of windings and having a third rectifier positive rail and a third rectifier negative rail; and a fourth six-pulse rectifier connected to the fourth set of windings and having a fourth rectifier positive rail and a fourth rectifier negative rail; and a common local output bus. The unit also includes an output bus configured to be connected to the load and including a positive output bus rail and a negative output bus rail and an H-bridge circuit connected across the output bus and outputs connected to the control coil. A controller is provided that receives an input signal from at least one of the output sets and selectively couples either the common local output bus or fourth rectifier negative rail to the output bus negative rail and one or more of the first, second and third six-pulse rectifiers to the output bus positive rail to provide a constant voltage to the load, wherein the controller selectively couples the common local output bus and fourth rectifier negative rail to the output bus negative rail based on a speed of the PMG, the controller also receiving a feedback voltage measured across the output bus and controlling switches in the H-bridge circuit based on the feedback voltage.

In a unit of any prior embodiment, the speed of the PMG is determined based on a frequency of the input signal.

In a unit of any prior embodiment, the unit further includes two output connection switches, wherein the controller selectively couples by closing one of the two output switches and opening another of the output switches.

In a unit of any prior embodiment, the unit further includes a first switch coupled between the first rectifier positive rail and the common local output bus; a second switch coupled between the second rectifier positive rail and the common local output bus; a third switch coupled between the first rectifier positive rail and the common local output bus; and a fourth switch coupled between the fourth rectifier negative rail and the output bus negative rail.

In a unit of any prior embodiment, the unit further includes: a fifth switch coupled between the second rectifier negative rail and the third rectifier positive rail; a sixth switch coupled between the common local output bus and the negative output bus rail; and a seventh switch coupled between the first rectifier negative rail and the second rectifier positive rail; wherein the controller selectively couples the common local output bus to the output bus negative rail by closing the sixth switch and couples the and fourth rectifier negative rail to the output bus negative rail by closing the fourth switch.

In a unit of any prior embodiment, the fourth rectifier positive rail is coupled to the third rectifier negative rail.

In a unit of any prior embodiment, the six pulse rectifiers are passive rectifiers.

In a unit of any prior embodiment: the first six-pulse rectifier forms a first DC voltage (Vdc1) between the first rectifier positive rail and the first rectifier negative rail from voltage received from the first set of windings; the second-six pulse rectifier forms a second DC voltage (Vdc2) between the second rectifier positive rail and the second rectifier negative rail from voltage received from the second set of windings; and Vdc1 is greater than Vdc2.

In a unit of any prior embodiment: the third six-pulse rectifier forms a third DC voltage (Vdc3) between the third rectifier positive rail and third rectifier negative rail from voltage received from the third set of windings; the fourth six-pulse rectifier forms a fourth DC voltage (Vdc4) between the fourth rectifier positive rail and fourth rectifier negative rail from voltage received from the fourth set of windings; and Vdc2>Vdc3>Vdc4.

In a unit of any prior embodiment, Vdc1 is about double Vdc2.

In a unit of any prior embodiment, Vdc2=2Vdc3=4Vdc4.

Also disclosed is a method of providing direct current (DC) power provided to a load. The method includes: generating alternating current (AC) power with a flux regulated permanent magnet generator (PMG) that includes first, second third and fourth sets of windings, each of the sets of winding including three windings and a control coil; and converting the AC power produced by the PMG into a DC output, with a rectifier section. The rectifier section includes: a first six-pulse rectifier connected to the first set of windings and having a first rectifier positive rail and first rectifier negative rail; a second six-pulse rectifier connected to the second set of windings and having a second rectifier positive rail and a second rectifier negative rail; a third six-pulse rectifier connected to the third set of windings and having a third rectifier positive rail and a third rectifier negative rail; and a fourth six-pulse rectifier connected to the fourth set of windings and having a fourth rectifier positive rail and a fourth rectifier negative rail; and a common local output bus. The method also includes: selectively coupling with a controller either the common local output bus or fourth rectifier negative rail to the output bus negative rail and one or more of the first, second and third six-pulse rectifiers to an output bus positive rail to provide a constant voltage to the load, wherein the controller selectively couples the common local output bus and fourth rectifier negative rail to the output bus negative rail based on a speed of the PMG; and measuring an voltage on between the output bus positive rail and the output bus negative rail and varying an current provided to the control coil based on the measurement.

According to any prior method, the speed of the PMG is determined based on a frequency of the input signal.

According to any prior method, the rectifier section includes two output connection switches; wherein the controller selectively couples by closing one of the two output switches and opening an other of the output switches.

According to any prior method, the rectifier section further includes: a first switch coupled between the first rectifier positive rail and the common local output bus; a second switch coupled between the second rectifier positive rail and the common local output bus; a third switch coupled between the first rectifier positive rail and the common local output bus; a fourth switch coupled between the fourth rectifier negative rail and the output bus negative rail; a fifth switch coupled between the second rectifier negative rail and the third rectifier positive rail; a sixth switch coupled between the common local output bus and the negative output bus rail; and a seventh switch coupled between the first rectifier negative rail and the second rectifier positive rail. The controller selectively couples the common local output bus to the output bus negative rail by closing the sixth switch and couples the and fourth rectifier negative rail to the output bus negative rail by closing the fourth switch.

According to any prior method, the fourth rectifier positive rail is coupled to the third rectifier negative rail.

According to any prior method, an output voltage of the first six-pulse rectifier is greater than an output voltage of the second six pulse rectifier.

According to any prior method, the output voltage of the second six-pulse rectifier is greater than an output voltage of the third six pulse rectifier and the output voltage of the third six pulse rectifier is greater than an output of the fourth six pulse rectifier.

According to any prior method, the wherein the output voltage of the first six-pulse rectifier is about double the output voltage of the second six pulse rectifier.

According to any prior method, the output voltage of the second six-pulse rectifier is about double the output voltage of the third six pulse rectifier and the output voltage of the third six pulse rectifier about double the output of the fourth six pulse rectifier.

BRIEF DESCRIPTION OF THE DRAWINGS

The following descriptions should not be considered limiting in any way. With reference to the accompanying drawings, like elements are numbered alike:

FIG. 2 is a table showing examples switch configurations to provide a constant voltage output at different FR PMG speeds.

DETAILED DESCRIPTION

Figure 1:
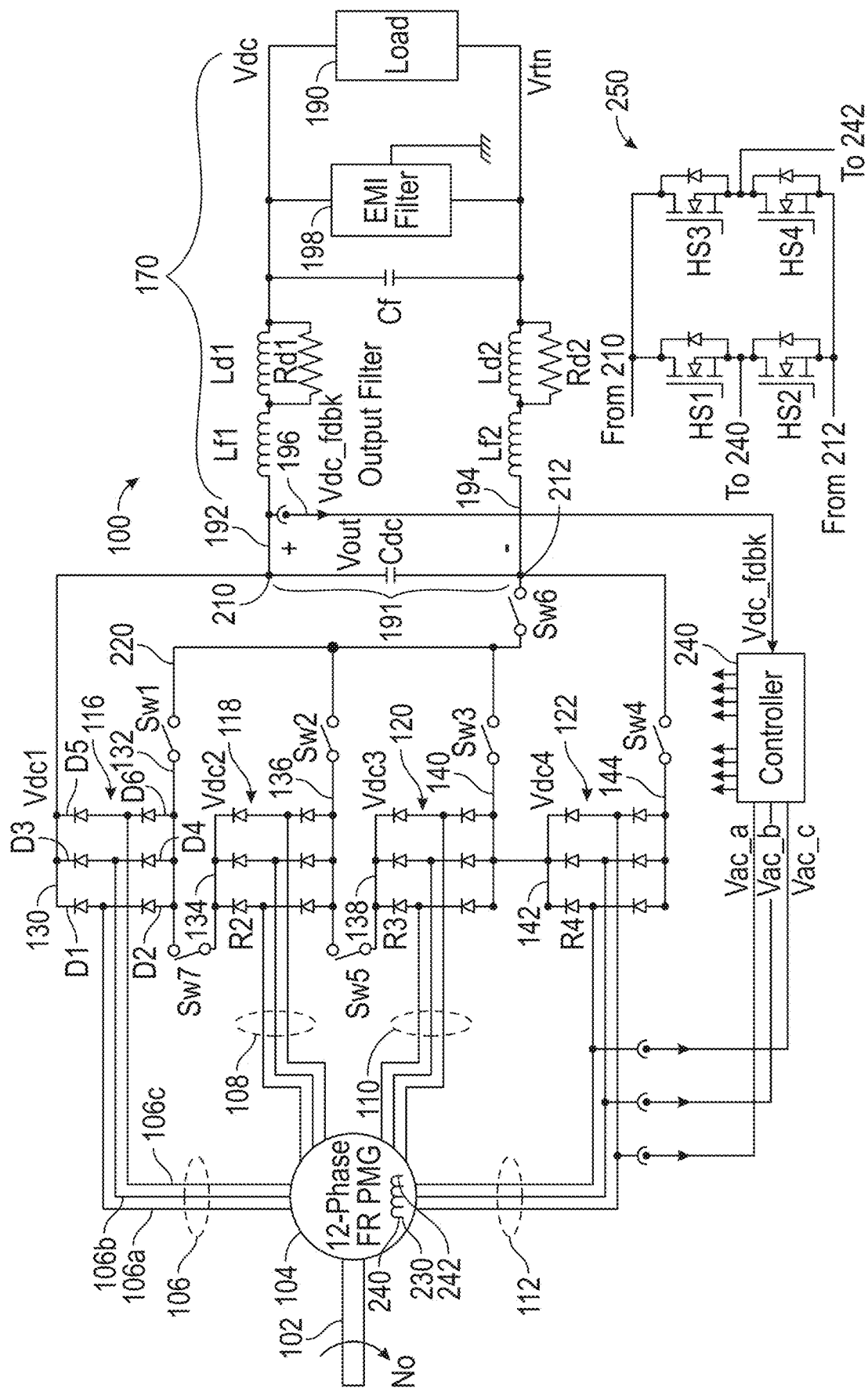
FIG. 1 is a schematic of a system that generates and delivers a regulated voltage to a load.

A detailed description of one or more embodiments of the disclosed apparatus and method are presented herein by way of exemplification and not limitation with reference to the Figures.

Disclosed herein is a power generating system that integrates a flux regulated 12-phase PMG and a power converter into an affordable high power density alternator with a good power quality, reduced losses, and low torque pulsation. In contrast to prior systems that employ active rectifiers, the disclosed system in one embodiment utilizes passive rectifiers. The power converted includes a controller that can provide a coil current to the FR PMG based on an output voltage by use of a conventional H-Bridge. In one embodiment, an initial soft start utilizes residual output of the FR PMG with sequential control of reconfigurable rectifier block disclosed below.

By employing the teachings herein wherein four passive rectifier are stacked so that the output voltages of them can be selectively added together, the output voltage can kept constant while the speed of the FR PMG changes. This can be done by controlling one or more switches that selectively choose which single rectifier or combination of the four passive rectifiers will contribute to the power provided to the load. Further, control of the coil current of the FR PMG can fine tune the output voltage independent of FR PMG speed and load.

FIG. 1 is schematic of power generation system 100 according to one embodiment. The system can be part of aircraft or other vehicle and can receive rotational energy from a prime mover such as a shaft 102 connected to aircraft turbine, a RAM air turbine or an internal combustion engine.

The system 100 includes a 12-phase FR PMG 104. The PMG 104 includes four sets three-phase windings and a control coil 230. The current in control coil controls by a H-Bridge 250 to provide for fine tuning of the voltage the FR PGM outputs based on a feedback voltage measured at the below described output bus. However, for larger changes, the current system also includes a configurable rectifier section as described below.

In FIG. 1, the PMG 104 provides three-phase outputs for each winding that are generally shown by winding outputs 106, 108, 110 and 112. In this example, the winding outputs 106 are shown as having three phases, 106a, 106b and 106c. The other winding outputs can also be three phase though not specifically referenced as such in FIG. 1.

Each set of winding outputs 106, 108, 110 and 112 is, respectively coupled to a six-pulse rectifier 116, 118, 120 and 122. The rectifiers are passive rectifiers in one embodiment. Each rectifier includes a positive rail and a negative rail. As illustrated, a first rectifier 116 includes positive rail 130 and negative rail 132, a second rectifier 118 includes positive rail 134 and a negative rail 136, a third rectifier 120 includes positive rail 138 and a negative rail 140 and a fourth rectifier 142 includes positive rail 142 and a negative rail 144. Each of the rectifier is formed in the same manner so only the first rectifier 130 is discussed in detail.

The first rectifier 116 includes D1 and D2 that serially connected between the positive and negative rails 130, 132 with output 106a connected between them. Similarly, D3 and D4 are serially connected between the positive and negative rails 130, 132 with output 106b connected between them and D5 and D6 are serially connected between the positive and negative rails 130, 132 with output 106c connected between them. In some cases, the negative rails referred to herein could also be referred to as return rails.

Based on the three phase input voltages received from the winding outputs 106a-106c, the first rectifier 116 produces a dc output voltage that this proportional to the magnitude of the signals on outputs 106a-106c. The voltage is measured between the positive and negative rails 130, 132 of the first rectifier 116 and is shown and referred to as Vdc1 herein.

Similarly, based on the three phase input voltages received from the windings outputs 108, the second rectifier 118 produces a dc output voltage that this proportional to the magnitude of the signals on outputs 108. The voltage is measured between the positive and negative rails 134, 136 of the second rectifier 118 and is shown and referred to as Vdc2 herein. Again, based on the three phase input voltages received from the windings outputs 110, the third rectifier 120 produces a dc output voltage that this proportional to the magnitude of the signals on outputs 110. The voltage is measured between the positive and negative rails 138, 140 of the second rectifier 120 and is shown and referred to as Vdc3 herein. Lastly, based on the three phase input voltages received from the windings outputs 112, the fourth rectifier 122 produces a dc output voltage that this proportional to the magnitude of the signals on outputs 112. The voltage is measured between the positive and negative rails 142, 144 of the fourth rectifier 118 and is shown and referred to as Vdc4 herein.

Herein, the PMG 102 is arranged such that each set of winding outputs that is proportions to another set of windings. For example, the first set of winding outputs 106 can produce a "full" output, the second set of outputs 108 can produce a "½" output that has an amplitude that is ½ of that of the first set of outputs 106. Similarly, the third set of outputs 1011 can produce a "¼" output that has an amplitude that is ¼th of that of the first set of outputs 106 and the fourth set of outputs 112 can produce a "⅛" output that has an amplitude that is ⅛$^{th}$ of the that of the first set of outputs 106. In such a case, Vdc1=2Vdc2=4Vdc3=8Vdc4. The particular values can be varied based on the requirements as will be understood by the skilled artisan after reviewing this document.

The four rectifiers 116, 118, 120 and 122 collectively have an output Vout between nodes 210 and 212. Also provided are a series of switches that can be opened/closed to select one or more of the rectifiers 116, 118, 120 and 122 to connect to the output Vout. Vout is provided to output bus 191 in one embodiment.

To smooth voltage output at Vout (e.g., across output bus 191) an output capacitor Cdc can be provided across the output bus 191. This voltage can be directly provided to a load 190 in one embodiment. Optionally, an output filter 170 can be provided between Vout and the load 190.

The output filter 170 includes inductances $L_{F1}$ and $L_{D1}$ arranged serially along a positive rail 192 of the DC output bus 191, and inductances $L_{F2}$ and $L_{D2}$ arranged serially along the return rail 194 of the DC output bus 191. Resistances $R_{D1}$ and $R_{D2}$ may further be arranged on the DC output bus, in parallel communication with inductances $L_{D1}$ and $L_{D2}$, respectively. Furthermore, a filter capacitor CF may be arranged across the DC output bus 191. Also, an EMI filter 198 can also be arranged across the DC output bus 191.

As shown, seven switches SW1-SW7 are provided that can select which rectifier(s) are coupled to the output bus 191. These switches include a first switch SW1 coupled between the negative rail 132 of the first rectifier and common local output bus 220, a second switch SW2 coupled between the negative rail 136 of the second rectifier and common local output bus 220 and a third switch SW3 coupled between the negative rail 140 of the third rectifier and common local output bus 220. A fourth switch SW4 is coupled between the negative rail 144 of the fourth rectifier 122 and the negative rail 194 of the output bus 191.

Two different possible output connections can be made to the negative or return rail 192 of the output bus 191. The first is through switch SW4 which couples the negative rail 144 of the fourth reciter 122 to the negative rail 192 and the other is through a sixth switch SW6 that couples the common local output bus 220 to the negative rail 192. As shown, the positive rail 130 of the first rectifier 116 is coupled to positive rail 192 of the output bus.

Also included are fifth and seventh switches SW5, SW7 that can serially couple, respectively, the first and second rectifiers 116, 118 and the second and third rectifier 118, 120. The positive rail 142 of the fourth rectifier 122 is connected to the negative rail 140 of the third rectifier 120.

Based on the configuration of the switches SW1-SW7 different voltages can be provided to the output but 191. By altering the switch configuration, a constant or relatively constant voltage can be provided to the output bus regardless of generator speed. Several examples are provided below to make this point more clear.

Consider in a situation where a voltage provided to the load (Vdc) of over about within 300 Vdc within 10% accuracy is desired. The PMG 104 could be configured such that Vdc1 is 320V, Vdc2 is 180V, Vdc3 is 80V and Vdc4 is 40V when the PMG 104 is operating at 20,000 rpm. Such output levels can be created by selecting the turns ratio of windings in the PMG 104. Is shall be understood, however that the exact 1, ½, ¼, ⅛ voltage ratio can be changed depending on the context.

To provide about 300 V to the load 190, switches SW1 and SW6 be closed and all other switches open. In this manner, Vdc1 and only Vdc1 is provided o the output but 191. However, consider the case where the rpm of PMG is reduced to 18,000. I such a case, the rectifier output values will be lower and as follows: Vdc1 is 288V, Vdc2 is 144V, Vdc3 is 72V and Vdc4 is 36V. In such a case to ensure over 300V is provided to the load, SW1, SW3 and SW4 can be closed. This will add the voltage across the first and fourth rectifiers 116 and 122 to provide a voltage of about 324V across the output bus 191. Similar switch modifications can be made based on motor speed (in RPM's) as shown in Table 1 below with the Vdc output voltage is shown at rated control coil current:

TABLE 1

| Speed, rpm | Vdc1 | Vdc2 | Vdc3 | Vdc4 | Sw1 | Sw2 | Sw3 | Sw4 | Sw5 | Sw6 | Sw7 | Vdc |
|---|---|---|---|---|---|---|---|---|---|---|---|---|
| 20000 | 320 | 160 | 80 | 40 | Closed | Open | Open | Open | Open | Closed | Open | 320 |
| 18000 | 288 | 144 | 72 | 36 | Closed | Open | Closed | Closed | Open | Open | Open | 324 |
| 16000 | 286 | 113 | 64 | 32 | Closed | Closed | Closed | Open | Closed | Closed | Open | 320 |
| 14000 | 224 | 312 | 80 | 28 | Closed | Closed | Open | Closed | Closed | Open | Open | 308 |
| 12000 | 192 | 98 | 48 | 24 | Open | Closed | Closed | Closed | Open | Open | Closed | 312 |
| 10000 | 160 | 80 | 40 | 20 | Open | Open | Open | Closed | Closed | Open | Closed | 300 |

The system also includes a controller 240. The controller 240 receives inputs Vac_a, Vac_b, and Vac_c from one of the sets of outputs. As shown, these signals are received from the fourth winding outputs 112 but any could suffice and only 1 phase may need to be example rather than the three. Based on the frequency of these inputs, rpm of the PMG can be determined. With reference to table 1, the controller can select the switch positions to achieve the desired output (e.g., greater than and within 10% of 300V).

For clarity, Table 1 is also reproduced in FIG. 2. In FIG. 2, when a voltage (e.g, Vdc2, etc) is being applied to the output bus 191, that voltage is expressed in bold. For completeness, to add the first and second rectifier voltages Vdc1 and Vdc2, switches SW2, SW6 and SW7 are closed. To add the first, second, and third rectifiers 116, 118 and 120, switches SW5, SW6, SW7 and SW3 are closed.

With reference again to FIG. 1, in another embodiment, a voltage sensor 196 that measures Vout and provide the measurement as a Vdc_fdbk signal to the controller. In one embodiment, Vdc_fdbk is used by the controller to determine the configuration of the four switches in the H-bridge 250. The H bridge is connected across the output bus 191 and in particular, is coupled across the positive and negative rails 192, 194 of the output bus 191. The H-Bridge includes four H-Bridge switches HS1, HS2, HS3 and HS4. The H-bridge allows controlling current in the control coil 230 of FR PMG 104 by pulse width modulating (PWM) of the switches (HS1-HS4) in response to the output of the voltage regulator located within controller 240. Fine output voltage tuning is achieved by reducing control coil current from its rated value. Voltage regulator fine tunes output voltage within five segments of FR PMG speed variation per FIG. 2 and Table above (10000-12000 rpm, 12000-14000 rpm, 14000-16000 rpm, 16000-18000 rpm, and 18000-20000 rpm). Operation of H-bridge (single phase) inverter is well known. The voltage regulator (not shown) selects voltage error signal as a difference between voltage reference (300V in above example) and feedback voltage, processes voltage error via proportional-integral (PI) block, and converts PI block output into PWM signals that control H-bridge switches via gate drives.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft power generation unit to generate direct current (DC) power provided to a load, the unit comprising:
    a flux regulated permanent magnet generator (PMG) that includes a control coil and first, second, third and fourth sets of windings, each of the winding sets including three windings;
    a rectifier section that includes:
        a first six-pulse rectifier connected to the first set of windings and having a first rectifier positive rail and first rectifier negative rail;
        a second six-pulse rectifier connected to the second set of windings and having a second rectifier positive rail and a second rectifier negative rail;
        a third six-pulse rectifier connected to the third set of windings and having a third rectifier positive rail and a third rectifier negative rail;
        a fourth six-pulse rectifier connected to the fourth set of windings and having a fourth rectifier positive rail and a fourth rectifier negative rail; and
        a common local output bus;
    an output bus configured to be connected to the load and including a positive output bus rail and a negative output bus rail;
    an H-bridge circuit connected across the output bus and outputs connected to the control coil; and
    a controller that receives an input signal from at least one of the output sets and selectively couples either the common local output bus or fourth rectifier negative rail to the output bus negative rail and one or more of the first, second and third six-pulse rectifiers to the output bus positive rail to provide a constant voltage to the load, wherein the controller selectively couples the common local output bus and fourth rectifier negative rail to the output bus negative rail based on a speed of the PMG, the controller also receiving a feedback voltage measured across the output bus and controlling switches in the H-bridge circuit based on the feedback voltage.

2. The unit of claim 1, wherein the speed of the PMG is determined based on a frequency of the input signal.

3. The unit of claim 1, further comprising:
    two output connection switches,
    wherein the controller selectively couples by closing one of the two output switches and opening another of the output switches.

4. The unit of claim 1, further comprising:
    a first switch coupled between the first rectifier positive rail and the common local output bus;
    a second switch coupled between the second rectifier positive rail and the common local output bus;
    a third switch coupled between the first rectifier positive rail and the common local output bus; and
    a fourth switch coupled between the fourth rectifier negative rail and the output bus negative rail.

5. The unit of claim 4, further comprising:
    a fifth switch coupled between the second rectifier negative rail and the third rectifier positive rail;
    a sixth switch coupled between the common local output bus and the negative output bus rail; and
    a seventh switch coupled between the first rectifier negative rail and the second rectifier positive rail;
    wherein the controller selectively couples the common local output bus to the output bus negative rail by closing the sixth switch and couples the and fourth rectifier negative rail to the output bus negative rail by closing the fourth switch.

6. The unit of claim 1, wherein the fourth rectifier positive rail is coupled to the third rectifier negative rail.

7. The unit of claim 1, wherein the six pulse rectifiers are passive rectifiers.

8. The unit of claim 1, wherein:
the first six-pulse rectifier forms a first DC voltage (Vdc1) between the first rectifier positive rail and the first rectifier negative rail from voltage received from the first set of windings;
the second-six pulse rectifier forms a second DC voltage (Vdc2) between the second rectifier positive rail and the second rectifier negative rail from voltage received from the second set of windings; and
Vdc1 is greater than Vdc2.

9. The unit of claim 8, wherein:
the third six-pulse rectifier forms a third DC voltage (Vdc3) between the third rectifier positive rail and third rectifier negative rail from voltage received from the third set of windings;
the fourth six-pulse rectifier forms a fourth DC voltage (Vdc4) between the fourth rectifier positive rail and fourth rectifier negative rail from voltage received from the fourth set of windings; and
Vdc2>Vdc3>Vdc4.

10. The unit of claim 9, wherein Vdc1 is about double Vdc2.

11. The unit of claim 10, wherein Vdc2=2Vdc3=4Vdc4.

12. A method of providing direct current (DC) power provided to a load, the method comprising:
generating alternating current (AC) power with a flux regulated permanent magnet generator (PMG) that includes a control coil and first, second third and fourth sets of windings, each of the sets of winding including three windings;
converting the AC power produced by the PMG into a DC output, with a rectifier section that includes:
a first six-pulse rectifier connected to the first set of windings and having a first rectifier positive rail and first rectifier negative rail;
a second six-pulse rectifier connected to the second set of windings and having a second rectifier positive rail and a second rectifier negative rail;
a third six-pulse rectifier connected to the third set of windings and having a third rectifier positive rail and a third rectifier negative rail;
a fourth six-pulse rectifier connected to the fourth set of windings and having a fourth rectifier positive rail and a fourth rectifier negative rail; and
a common local output bus; and
selectively coupling with a controller either the common local output bus or fourth rectifier negative rail to the output bus negative rail and one or more of the first, second and third six-pulse rectifiers to an output bus positive rail to provide a constant voltage to the load, wherein the controller selectively couples the common local output bus and fourth rectifier negative rail to the output bus negative rail based on a speed of the PMG; and
measuring an voltage on between the output bus positive rail and the output bus negative rail and varying an current provided to the control coil based on the measurement.

13. The method claim 12, wherein the speed of the PMG is determined based on a frequency of the input signal.

14. The method of claim 12, wherein the rectifier section includes two output connection switches;
wherein the controller selectively couples by closing one of the two output switches and opening an other of the output switches.

15. The method of claim 12, wherein the rectifier section further includes:
a first switch coupled between the first rectifier positive rail and the common local output bus;
a second switch coupled between the second rectifier positive rail and the common local output bus;
a third switch coupled between the first rectifier positive rail and the common local output bus;
a fourth switch coupled between the fourth rectifier negative rail and the output bus negative rail;
a fifth switch coupled between the second rectifier negative rail and the third rectifier positive rail;
a sixth switch coupled between the common local output bus and the negative output bus rail; and
a seventh switch coupled between the first rectifier negative rail and the second rectifier positive rail;
wherein the controller selectively couples the common local output bus to the output bus negative rail by closing the sixth switch and couples the and fourth rectifier negative rail to the output bus negative rail by closing the fourth switch.

16. The method of claim 12, wherein the fourth rectifier positive rail is coupled to the third rectifier negative rail.

17. The method of claim 12, wherein an output voltage of the first six-pulse rectifier is greater than an output voltage of the second six pulse rectifier.

18. The method claim 17, wherein the output voltage of the second six-pulse rectifier is greater than an output voltage of the third six pulse rectifier and the output voltage of the third six pulse rectifier is greater than an output of the fourth six pulse rectifier.

19. The method of claim 18, wherein the wherein the output voltage of the first six-pulse rectifier is about double the output voltage of the second six pulse rectifier.

20. The method of claim 19, wherein the output voltage of the second six-pulse rectifier is about double the output voltage of the third six pulse rectifier and the output voltage of the third six pulse rectifier about double the output of the fourth six pulse rectifier.

* * * * *